Nov. 12, 1963  F. G. PHINNEY  3,110,513
LATCH MECHANISM
Filed May 12, 1961  2 Sheets-Sheet 1

FREDERICK G. PHINNEY
*INVENTOR.*

BY John R. Faulkner
John J. Roethel
ATTORNEYS

Nov. 12, 1963   F. G. PHINNEY   3,110,513
LATCH MECHANISM
Filed May 12, 1961   2 Sheets-Sheet 2

FREDERICK G. PHINNEY
INVENTOR.

BY John R. Faulkner
John J. Roethel
ATTORNEYS

United States Patent Office 3,110,513
Patented Nov. 12, 1963

3,110,513
LATCH MECHANISM
Frederick G. Phinney, Dearborn, Mich., assignor to Ford Motor Company, Dearborn, Mich., a corporation of Delaware
Filed May 12, 1961, Ser. No. 109,703
7 Claims. (Cl. 292—226)

This invention relates to latch mechanisms and more particularly to such mechanisms as applied to luggage compartment closures or the like on vehicle bodies.

In general, the latch mechanism embodying the present invention comprises a housing provided with a cover plate, the latter having an extension which extends upwardly a substantial distance above the upper edge of the housing. An elongated release lever is pivoted at its lower end within the housing near the lower end of the latter. A latch element is pivoted to the lever intermediate the ends of the latter, the latch element being freely swingable relative to the lever. The housing is provided with an aperture through which a corner section of the latch element outwardly projects in closure latched position. A latch actuating cam is pivotally supported on the cover plate extension. The latch actuating cam may be actuated to swing the elongated lever in a direction to retract the latch element into the housing, thus permitting unlatching of the closure structure. Suitable springs are provided which urge and yieldably maintain the latch element and the elongated lever in their normal latched position.

The construction and arrangement of the latch mechanism release lever and the latch element is such that the latter is retracted into the housing from beneath the cooperating edge of a striker device rather than being frictionally dragged out from under such edge, as would occur if the lever and latch element were integral as in many prior art mechanisms. The latch actuating cam is adapted to be directly operated through turning movement of a key inserted into a conventional key cylinder device coupled to the cam, and the absence of frictional drag on the latch element is reflected in a low degree of key torque required to turn the key to cause operaton of the latch actuating cam.

It is an object of the present invention to provide a simple, compact, efficient and economical latch mechanism which will meet all durability and operational requirements for use on vehicles.

Other objects and advantages of the present invention will be made more apparent as this description proceeds, particularly when considered in connection with the accompanying drawings, wherein:

FIG. 1 is a side elevational view of a latch mechanism constructed in accordance with the present invention, as applied for the releasable latching of a luggage compartment closure or the like;

Figure 1:
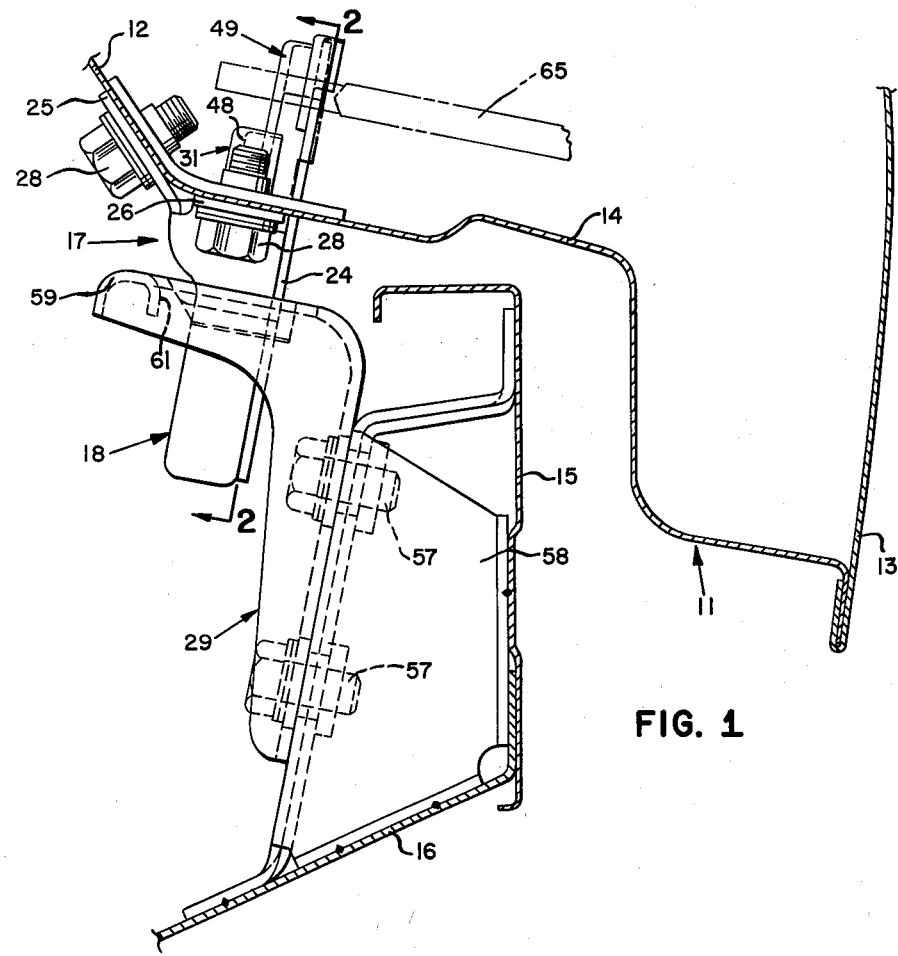

The drawings illustrate the latch mechanism of the present invention as applied to the luggage compartment door of an automobile body, but it will be understood that the device is also applicable as well to other doors and closure members of motor vehicles.

Referring now to the drawings, the reference character 11 indicates the luggage compartment door of an automobile body. The door comprises inner and outer panels 12 and 13, the inner panel 12 having an outwardly extending stepped lower flange 14 which is joined to the lower edge of the outer panel 13. The luggage compartment door overlies a fixed back panel 15 extending upwardly from the rearward portion of the floor panel 16 of the vehicle body luggage compartment.

The latch mechanism generally designated 17, comprises a substantially rectangular housing or casing 18. In its installed position on the compartment door, the longitudinal axis of the housing or casing 18 extends in a substantially up and down direction. The housing or casing 18 has an integral first or inner wall 19, side walls 21 and 22 and a bottom or end wall 23. The term "inner" as applied to wall 19 indicates that this wall, in the installed position of the latch mechanism, is the wall contiguous to the inner panel 12 of the compartment door 11. The upper end of the housing, the end opposite the end wall 23 is open. A second or outer wall 24, or one in parallel opposition to the inner wall 19, is an elongated cover plate adapted to be secured to the side walls 21 and 22 and the bottom wall 23 after the assembly of the latch mechanism components within the housing or casing 18. It will be noted that the side walls 21 and 22 are tapered (see FIGS. 2 and 3), for a purpose to be more fully explained.

Figure 4:
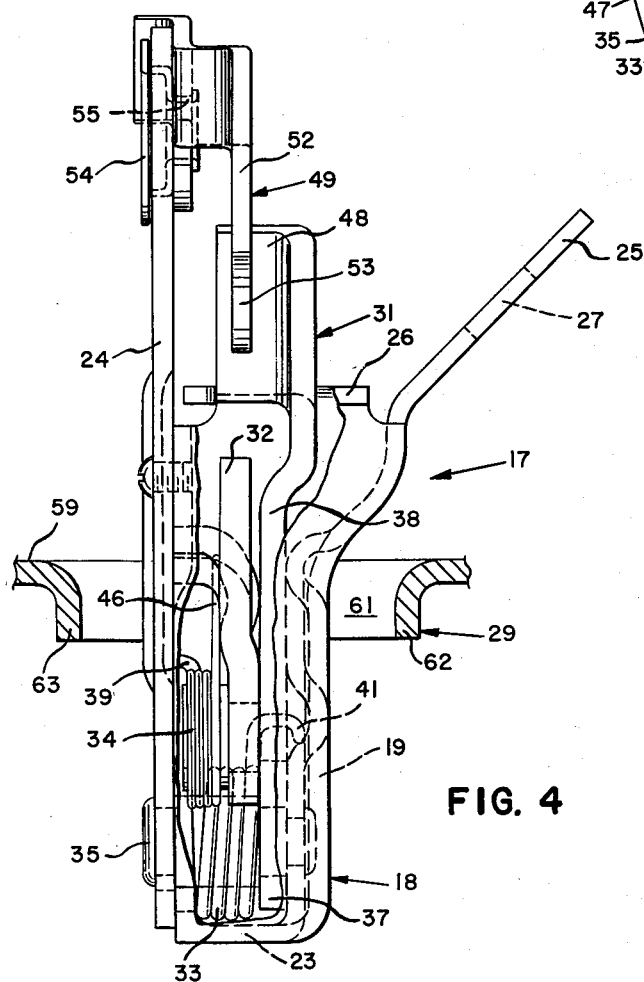
FIG. 4 is an enlarged side elevational view of the latch mechanism with part of the casing broken away to show the interior relationship of the latch mechanism elements.

The housing or casing 18 has suitable mounting flanges integral with its inner and side walls. As best seen in FIG. 4, one flange 25 is integral with the inner wall 19 and extends upwardly and away from the housing or casing 18 at a substantial angle. The other flanges 26 are integral with the side walls 21 and 22 and extend laterally outwardly of the housing or casing 18 at right angles to the planes of the side walls. The flanges are provided with elongated slots 27 which are substantially larger than the diameter of the fastening devices, indicated at 28 in FIG. 1, for securing the latch mechanism to the compartment door. As seen in FIG. 1, the flanges of the housing or casing 18 are bolted to the underside of the stepped flange 14 of the compartment door. The enlarged slots 27 permit selective positioning of the latch mechanism on the casing door so that the latter may be suitably aligned with a striker or keeper device, generally designated 29, which is mounted on the compartment floor panel. It will be understood that the lower flange 14 is provided with a suitable aperture through which the elongated cover plate and components of the latch mechanism project.

Housed within the casing 18 are the component parts of the latch mechanism 17. These parts are few in number and consist of a release lever 31, a latch element 32, two springs 33 and 34, a pivot shaft or stud 35 and a shoulder rivet 36.

Figure 2:
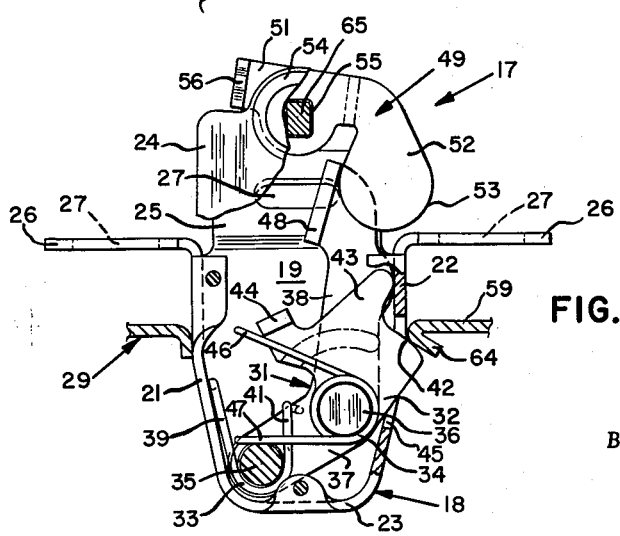
FIG. 2 is a vertical sectional view taken substantially on the line 2—2 of FIG. 1 looking in the direction of the arrows.

The release lever 31 is an elongated member which, with reference to FIG. 2, has an upwardly inclined short angular leg or portion 37 and an elongated leg or portion 38 extending generally longitudinally of the casing 18. At its lower end the release lever is pivotally mounted on the pivot shaft or stud 35, the latter extending between the inner wall 19 and the cover plate 24 of the casing 18.

The spring 33 is provided to yieldably hold the release lever 31 against the side wall 22 of the casing 18. The spring 33 is a coiled spring which encompasses the pivot stud 35 and has two upstanding free end portions 39 and 41. The end portion 39 lies against the inner surface of the side wall 21 and the end portion 41 hooks over the upper edge of the leg portion 37 of the release lever 31. The spring 33 is sufficiently preloaded to hold the release lever against the inner surface of the side wall 22 and to yieldably resist swinging movement of the release lever 31 in a counterclockwise direction, as viewed in FIG. 2.

The latch element 32 comprises a plate member which is pivotally mounted on the release lever 31. It is pivotally mounted on a rivet 36 positioned at the juncture of the short leg portion 37 and the longitudinally extended leg 38 of the release lever 31. The latch element 32 extends substantially upwardly from the pivotal connection and is provided around its upper periphery with an arcuated latching surface 42, an upwardly projecting finger portion 43 and a lug or abutment 44. As seen in FIG. 2, the latching surface 42 in latched position of the latch mechanism projects through an aperture 45 in the side wall 22 of the housing or casing 18. The upstanding finger 43 is adapted to abut the inner surface of the side wall 22 to limit the extent to which the cam portion may project through the aperture 45. The lug 44 is engaged by a free end portion 46 of the spring 34. The spring 34 is a coil spring having its coiled portion encircling the shoulder stud 36. The other free end portion 47 of the spring 34 extends in a substantially horizontal direction and is hooked over the extreme lower end of the angular portion 37 of the release lever 31. This spring is sufficiently preloaded so as to urge the latch element in a clockwise direction as viewed in FIG. 2.

The release lever 31 projects through the opening in the upper end of the housing or casing 18 and has at its upper extremity a laterally extending flange 48 which is adapted to be engaged by a latch actuating cam 49, the latter being actuatable to release the latch mechanism from latched position. With reference to FIG. 2, the latch actuating cam 49 is seen to comprise an L-shaped lever having a horizontally extending portion 51 and a vertically extending portion 52. The vertically extending portion is somewhat enlarged and has a rounded contour or cam surface 53 adapted to engage the flange 48 on the release lever 31. The latch actuating cam 49 is pivotally mounted intermediate the ends of its horizontal portion 51 on the portion of the cover plate 24 extending above the housing or casing 18. The pivot is a tubular rivet 54 having a square or rectangular hole or aperture 55 through its center. At its left end, as viewed in FIG. 2, the horizontal portion 51 of the latch actuating cam 49 terminates in a lug 56 adapted to engage the upper edge of the cover plate thereby limiting the extent of movement of the latch actuating cam in a counterclockwise direction. Because of the normal abutting relation between the flange 48 on the release lever and the cam surface 53 of the latch actuating cam 49, the latch actuating cam is normally maintained in its FIG. 2 position through the action of the spring 33 yieldably maintaining the release lever 31 against the inner surface of the side wall 22 of the housing or casing 18.

Figure 3:
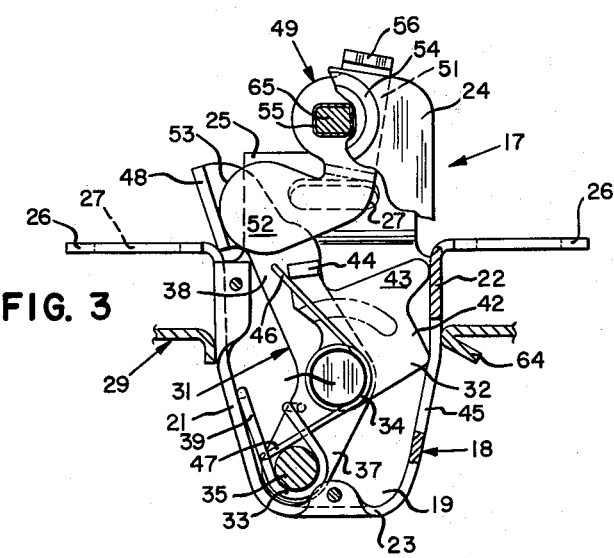
FIG. 3 is a view in part similar to FIG. 2 illustrating parts of the latch mechanism in a second operative position.

Before explaining the operation of the latch mechanism embodying the present invention, the striker 29 will be briefly described. It is illustrated as a substantially L-shaped member secured by bolts 57 to a bracket 58 which is welded in place in the corner between the luggage compartment floor 16 and the fixed panel 15. The substantially horizontal portion 59 of the striker or keeper is provided with a rectangular opening 61 therein, the lips of which are bent downwardly as indicated at 62 and 63. Another lip 64 is turned inwardly over upon itself to form a latch element engageable surface. This is shown in FIGS. 2 and 3. Also with reference to FIG. 2, the width of the rectangular opening 61 in the upper surface of the keeper or striker 29 is such as to provide a loose fit relative to the width of the housing between the vertical portions of the side walls 21 and 22. In other words, the housing or casing 18 must be able to readily slide through the rectangular opening 61 in the upper portion of the striker or keeper device. The tapered portions of the side walls 21 and 22 provide for any misalignment of the closure with the opening in the vehicle body. As the housing 18 enters the opening 61 in the horizontal portion 59 of the keeper or striker, it automatically aligns itself because of its tapered side wall construction.

The operation of the latch mechanism 17 is best explained with reference to FIGS. 2 and 3. In FIG. 2 the latch mechanism 17 is shown in fully latched position. To release the latch mechanism so that the closure may be opened, it is necessary to swing the release lever 31 in a counterclockwise direction. This is done through the latch actuating cam 49. The cam is operated by a conventional key cylinder mechanism (not shown) mounted in the outer panel 13 of the closure. It will be understood that the key cylinder mechanism is adapted to be coupled to an extension shaft 65 shown in dot and dash outline in FIG. 1. The extension shaft 65 passes through the aperture 55 in the latch actuating cam tubular rivet 54. The direction of rotation to unlatch the latch mechanism is a counterclockwise direction as viewed in FIG. 2. As the portion 52 on the latch actuating cam 49 swings in a clockwise direction about its pivot, its surface 53 will engage the flange 48 on the release lever causing the latter to be swung in the necessary counterclockwise direction about the pivot shaft 35. Because of the action of the spring 34 which urges the latch element 32 in a clockwise direction, the pivot axis of the latch element 32 will move away from the lip 64 on the striker or keeper device 29 causing the latching surface 42 to be dropped or radially moved from under the engaged lip 64. There is thus no sliding fritcion between the latching surface 42 of the latch element 32 and the coacting edge 64 of the striker or keeper device 29.

The retracting movement of the latch element continues until the relationship shown in FIG. 3 is attained. In this relationship, the latch element 32 is completely retracted within the housing 18 and the closure 11 may be lifted relative to the fixed back panel 15 of the luggage compartment. When the housing 18 clears the position shown in FIG. 3, the key may be released. As soon as the pressure on the latch actuating cam 49 is released, the springs 33 and 34 coact to restore the latch element 32 and the release lever 31 to their normal operative position as shown in FIG. 2.

When it is desired to close and latch the closure 11, it is only necessary to swing the closure downwardly so that the housing or casing 18 will penetrate the aperture 61 in the striker or keeper 29. The latch element 32 will be forced inwardly against the action of the spring 34 but, normally, no movement of the release lever 31 will occur. That is, the latch element 32 will move relatively to the release lever 31 until its latching surface 42 drops below the lip 64 of the striker or keeper 29 at which point the latch element will be forced outwardly into engagement with this lip. The compression of the usual seal found around a closure opening, such as a luggage compartment opening, will permit sufficient overtravel of the housing or casing 18 through the aperture 64 in the striker or keeper 29 to permit the latch element 32 to be urged fully outwardly through the side wall aperture 45 in the housing of casing 18.

The advantages of the present construction and arrangement are (1) easier closing effort, (2) key torque not affected by seal pressure, (3) the lock case serves as a dovetail to align the closure and compartment walls, (4) the size of the latch mechanism is reduced appreciably, (5) the number of parts are an absolute minimum, (6) close manufacturing tolerances are not required and (7) the latch mechanism is relatively inexpensive.

It will be understood that the invention is not to be limited to the exact construction shown and described, but that various changes and modifications may be made without departing from the spirit and scope of the invention as defined in the appended claims.

I claim:

1. A latch mechanism comprising a housing having walls in spaced relationship to each other and side walls therebetween, one of said walls having an extension extending beyond one end of said housing, said one end of the housing being open, an elongated lever, means pivotally mounting said elongated lever within and at the other end of said housing, said lever projecting through said opening, a latch element, means pivotally mounting said latch element on said elongated lever above the pivotal mounting of the latter and within said housing, said latch element having a keeper engaging portion projecting through an aperture in one of said side walls, and a latch actuating cam pivotally mounted on said extension, said latch actuating cam and elongated lever having parts thereof in abutting relationship, said latch actuating cam being swingable to cause its part to abut the elongated lever part to swing said lever in a direction to retract said latch element through said side wall aperture.

2. A latch mechanism comprising a housing having walls in spaced relationship to each other and side walls therebetween, one of said walls having an extension extending beyond one end of said housing, said one end of the housing being open, an elongated lever having two angularly related portions, one of said portions extending substantially parallel to one of said side walls and projecting through the open end of said housing, means pivotally mounting said elongated lever within said housing at the other end of the latter, the juncture of said two angularly related portions being above the pivot axis of said lever, a latch element, means pivotally mounting said latch element on said elongated lever at the juncture of said angularly related portions and within said housing, said latch element having a keeper engaging portion projecting through an aperture in one of said side walls, and a latch actuating cam pivotally mounted on said extension, said latch actuating cam and elongated lever having parts thereof in abutting relationship, said latch actuating cam being swingable in one direction to cause its part to abut the elongated lever part to swing said lever in an opposite direction to retract said latch element through said side wall aperture.

3. A latch mechanism comprising a housing having first and second walls in spaced relationship to each other and side walls therebetween, one of said walls having an extension extending beyond one end of said housing, said one end of the housing being open, an elongated lever having two angularly related portions, one of said portions extending substantially parallel to one of said side walls and projecting through the open end of said housing, means pivotally mounting said elongated lever at one end thereof within said housing at the other end of the latter, spring means normally urging said elongated lever against one of said side walls, a latch element, means pivotally mounting said latch element on said elongated lever at the juncture of said angularly related portions and within said housing, said latch element having a keeper engaging portion projecting through an aperture in said one of said side walls, and a latch actuating cam pivotally mounted on said extension, said latch actuating cam and elongated lever having parts thereof in abutting relationship, said latch actuating cam being swingable in one direction to cause its part to abut the elongated lever part to swing said lever in an opposite direction against the resistance of said spring means to retract said latch element through said side wall aperture.

4. A latch mechanism comprising a housing having first and second walls in spaced relationship to each other and side walls therebetween, one of said walls having an extension extending beyond one end of said housing, said one end of the housing being open, an elongated lever having two angularly related portions, one of said portions extending substantially parallel to one of said side walls and projecting through the open end of said housing, means pivotally mounting said elongated lever at one end thereof within said housing at the other end of the latter, a latch element, means pivotally mounting said latch element on said elongated lever at the juncture of said angularly related portions and within said housing, said latch element having a keeper engaging portion projecting through an aperture in one of said side walls, spring means encircling the means pivotally mounting said latch element on said elongated lever normally urging said latch element toward said side wall, and a latch actuating cam pivotally mounted on said extension, said latch actuating cam and elongated lever having parts thereof in abutting relationship, said latch actuating cam being swingable in one direction to cause its part to abut the elongated lever part to swing said lever in an opposite direction to retract said latch element against the resistance of said spring means through said side wall aperture.

5. A latch mechanism comprising a housing having first and second walls in spaced relationship to each other and side walls therebetween, one of said walls having an extension extending beyond one end of said housing, said one end of the housing being open, an elongated lever having two angularly related portions, one of said portions extending substantially parallel to one of said side walls and projecting through the open end of said housing, means pivotally mounting said elongated lever at one end thereof within said housing at the other end of the latter, first spring means encircling the means pivotally mounting said elongated lever within said housing and normally urging said lever against one of said side walls, a latch element, means pivotally mounting said latch element on said elongated lever at the juncture of said angularly related portions and within said housing, second spring means encircling the means pivotally mounting said latch element on said elongated lever and normally urging said latch element toward said one of said side walls, said latch element having a keeper engaging portion projecting through an aperture in said one of said side walls, and a latch actuating cam pivotally mounted on said extension, said latch actuating cam and elongated lever having parts thereof in abutting relationship, said latch actuating cam being swingable in one direction to cause its part to abut the elongated lever part to swing said lever in an opposite direction to retract said latch element through said side wall aperture, both said elongated lever and latch element reacting against the resistance of said first and second spring means, respectively.

6. A latch mechanism comprising a substantially rectangular housing having walls in spaced relationship to each other and side walls therebetween, one of said walls extending beyond one end of said housing and said end of the housing having an opening therein, an elongated lever having two angularly related portions, one of said angularly related portions being pivotally mounted at one end thereof within said housing contiguous to one of said side walls and extending toward the other side wall, the other of said angularly related portions extending from the other end of said one angularly related portion in a direction substantially parallel to the other of said side walls and projecting through said opening, a latch element pivotally mounted on said elongated lever substantially at the juncture of said angularly related portions, and a latch actuating cam pivotally mounted on said one parallel wall exteriorly of said housing, said latch element having a keeper engaging portion projecting through an aperture in one of said side walls, said latch actuating cam and elongated lever having parts thereof in abutting relationship, said latch actuating cam being swingable in one direction to cause its part to abut the elongated lever part to swing said lever in a direction to retract said latch element through said side wall aperture.

7. A latch mechanism comprising a substantially rectangular housing having walls in spaced relationship to each other and side walls therebetween, one of said walls extending beyond one end of said housing and said end of the housing having an opening therein, an elongated lever having two angularly related portions, one of said angularly related portions being pivotally mounted at one end thereof within said housing contiguous to one of said side walls and extending toward the other side wall, the other of said angularly related portions extending from the other end of said one angularly related portion in a direction substantially parallel to the other of said side walls and projecting through said opening, a latch element pivotally mounted on said elongated lever substantially at the juncture of said angularly related portions, and a latch actuating cam pivotally mounted on said one parallel wall exteriorly of said housing, said latch element having a keeper engaging portion projecting through an aperture in one of said side walls, said latch actuating cam and elongated lever having parts thereof in abutting relationship, said latch actuating cam being swingable in one direction to cause its part to abut the elongated lever part to swing said lever in a direction to retract said latch element through said side wall aperture, and dual spring means acting on said elongated lever and said latch element urging both toward normal latched position of said lever and latch element.

References Cited in the file of this patent

UNITED STATES PATENTS

| | | |
|---|---|---|
| 258,611 | Stone | May 30, 1882 |
| 2,709,910 | Vigmostad | June 7, 1955 |